United States Patent
Holmdahl et al.

(10) Patent No.: US 6,452,586 B1
(45) Date of Patent: Sep. 17, 2002

(54) COMPUTER INPUT DEVICE PROVIDING TACTILE FEEDBACK

(75) Inventors: Todd E. Holmdahl, Bothell; Erik von Fuchs, Duvall; Michael R. Hooning, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/201,481

(22) Filed: Nov. 30, 1998

(51) Int. Cl.$^7$ ................................................ G09G 5/08
(52) U.S. Cl. ..................... 345/163; 345/158; 363/36
(58) Field of Search ................. 345/163, 157, 345/156, 158; 363/36–38

(56) References Cited

U.S. PATENT DOCUMENTS

| | | | |
|---|---|---|---|
| 3,497,668 A | 2/1970 | Hirsch | 340/222 |
| 3,919,691 A | 11/1975 | Noll | 340/172.5 |
| 4,655,673 A | 4/1987 | Hawkes | 414/730 |
| 4,667,182 A | 5/1987 | Murphy | 340/407 |
| 4,687,444 A | 8/1987 | Garner | 434/114 |
| 4,712,101 A | * 12/1987 | Culver | 340/710 |
| 4,757,302 A | 7/1988 | Hatakeyama et al. | 340/407 |
| 4,795,296 A | 1/1989 | Jau | 414/5 |

(List continued on next page.)

FOREIGN PATENT DOCUMENTS

| | | |
|---|---|---|
| DE | 38 30 933 C2 | 10/1989 |
| DE | 43 41 917 A1 | 6/1992 |
| DE | 41 40 780 C2 | 9/1992 |
| DE | 44 01 937 C1 | 2/1995 |
| DE | 94 15 184 | 2/1995 |
| DE | 195 01 439 A1 | 9/1996 |
| EP | 0 265 011 A1 | 4/1988 |
| EP | 0 489 469 A1 | 6/1992 |
| EP | 0 520 089 A1 | 12/1992 |
| EP | 0 607 580 A1 | 7/1994 |
| EP | 0 626 634 A2 | 11/1994 |
| EP | 0 662 654 A1 | 7/1995 |
| JP | 59-119437 | 7/1984 |
| JP | 04336316 | 11/1992 |
| WO | WO 95/20787 | 8/1995 |
| WO | WO 95/32459 | 11/1995 |
| WO | WO 96/07965 | 3/1996 |
| WO | WO 96/18942 | 6/1996 |
| WO | WO 96/25702 | 8/1996 |
| WO | WO 96/28777 | 9/1996 |

OTHER PUBLICATIONS

"Feeling and Seeing: Issues in Force Display" by Margaret Minsky et al., Computer Graphics Mar., 1990 pp. 236–244.

"A Comparison of Tactile, Auditory and Visual Feedback in a Pointing Task Using a Mouse–type Device" by Motoyuki Akamatsu et al., Ergonomics, 1995, vol. 38, No. 4 pp. 816–827.

"Seeing Eye Mouse" IBM Technical Disclosure Bulletin, vol. 28, No. 3, Aug. 1985 pp. 1343–1344.

"Mouse Ball–Actuating Device With Force and Tactile Feedback" IBM Technical Disclosure Bulletin, vol. 32, No. 9B, Feb. 1990 pp. 230–235.

(List continued on next page.)

Primary Examiner—Richard Hjerpe
Assistant Examiner—Kimnhung Nguyen
(74) Attorney, Agent, or Firm—Theodore M. Magee; Westman, Champlin & Kelly, P.A.

(57) ABSTRACT

An input device for a computer system includes a housing and an output circuit located in the housing. The output circuit is capable of providing an output signal to the computer system that is indicative of movement of at least a portion of the input device. A physical feedback device is also located in the housing and is capable of stimulating a localized area of the housing in response to a signal from the computer system.

22 Claims, 8 Drawing Sheets

U.S. PATENT DOCUMENTS

| | | | |
|---|---|---|---|
| 4,868,549 A | | 9/1989 | Affinito et al. ............. 340/710 |
| 5,185,561 A | | 2/1993 | Good et al. .................. 318/432 |
| 5,186,629 A | * | 2/1993 | Rohen ......................... 434/114 |
| 5,237,311 A | | 8/1993 | Mailey et al. ............... 304/710 |
| 5,268,674 A | * | 12/1993 | Howard et al. ............. 345/163 |
| 5,296,871 A | | 3/1994 | Paley .......................... 345/163 |
| 5,351,677 A | | 10/1994 | Kami et al. ..................... 128/6 |
| 5,389,849 A | | 2/1995 | Asano et al. ................ 310/323 |
| 5,506,605 A | | 4/1996 | Paley .......................... 345/163 |
| 5,555,894 A | | 9/1996 | Doyama et al. ............ 128/782 |
| 5,585,823 A | * | 12/1996 | Duchon et al. ............. 345/163 |
| 5,589,828 A | | 12/1996 | Armstrong ................... 341/20 |
| 5,589,854 A | | 12/1996 | Tsai ............................ 345/161 |
| 5,619,180 A | | 4/1997 | Massimino et al. ....... 340/407.1 |
| 5,625,576 A | | 4/1997 | Massie et al. ............... 364/578 |
| 5,643,087 A | | 7/1997 | Marcus et al. ................. 463/38 |
| 5,666,473 A | | 9/1997 | Wallace ...................... 345/420 |
| 5,684,722 A | * | 11/1997 | Thorner et al. ............. 364/578 |
| 5,691,898 A | | 11/1997 | Rosenberg et al. ......... 364/190 |
| 5,692,956 A | | 12/1997 | Rifkin ........................... 463/37 |
| 5,699,083 A | * | 12/1997 | Lo ............................... 345/163 |
| 5,717,427 A | * | 2/1998 | Lin .............................. 345/163 |
| 5,790,108 A | | 8/1998 | Salcudean et al. .......... 345/184 |
| 5,808,568 A | * | 9/1998 | Wu .............................. 345/163 |
| 5,986,643 A | * | 11/1999 | Harvill et al. .............. 345/156 |

OTHER PUBLICATIONS

"Mouse/Keyboard Concept Incorporating Unique Devices For Controlling CRT Display Cursors"by Nassimbene, IBM Technical Disclosure Bulletin, vol. 27, No. 10B, Mar. 1985 pp. 6299–6305.

"Braille Computer Mouse With Tactile Position Feedback" IBM Technical Dislosure Bulletin vol. 31, No. 12, May 1989 p. 386.

* cited by examiner

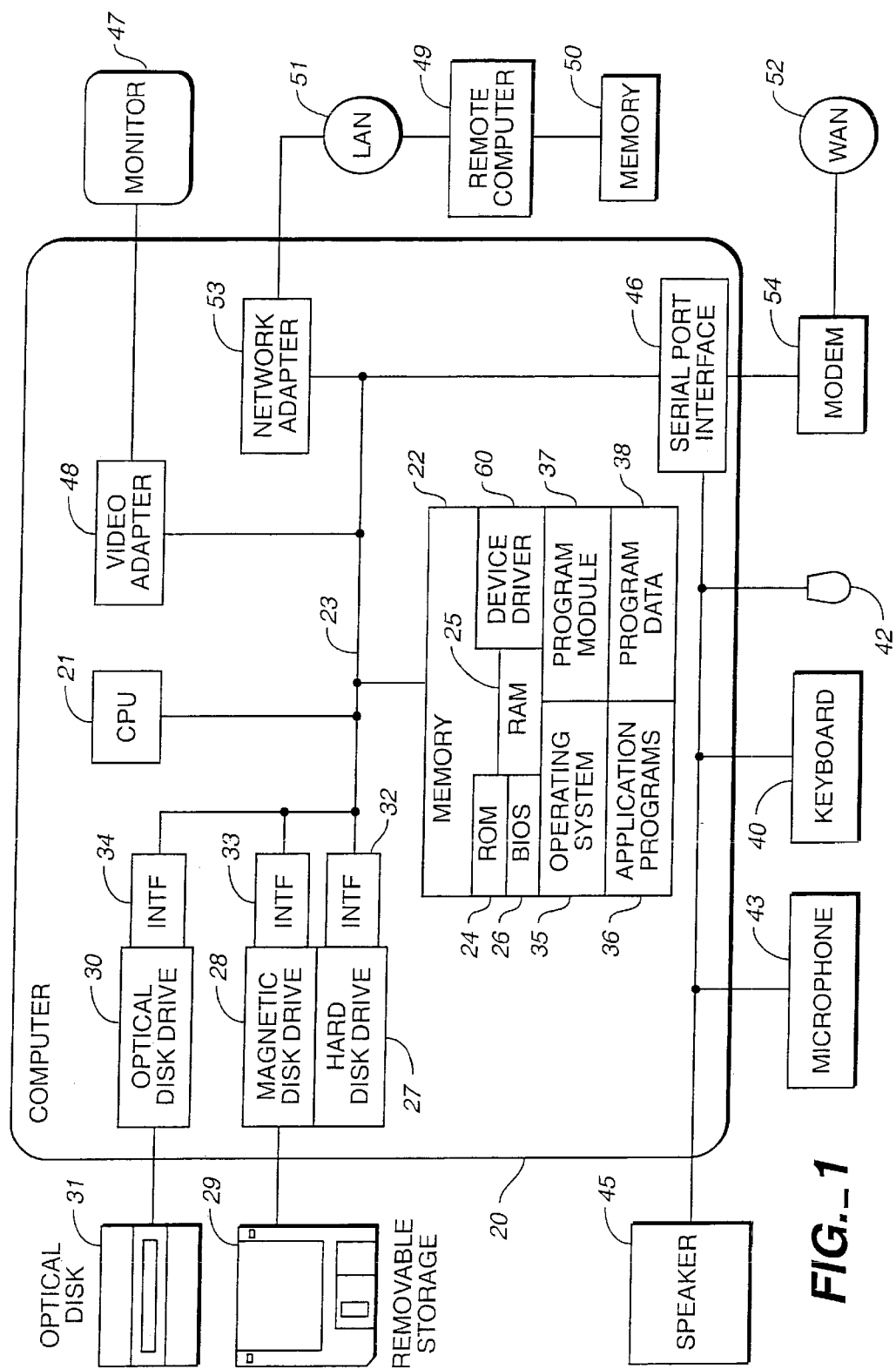
FIG._1

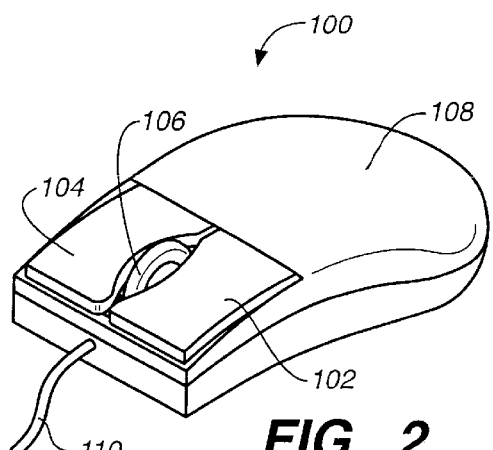
FIG._2
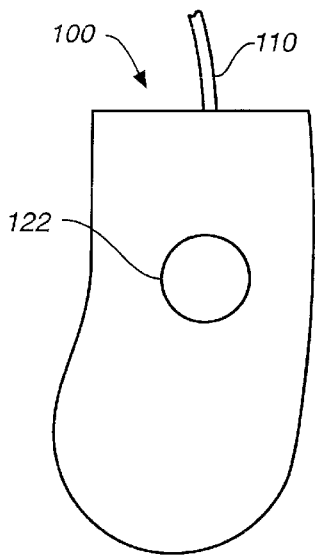
FIG._3
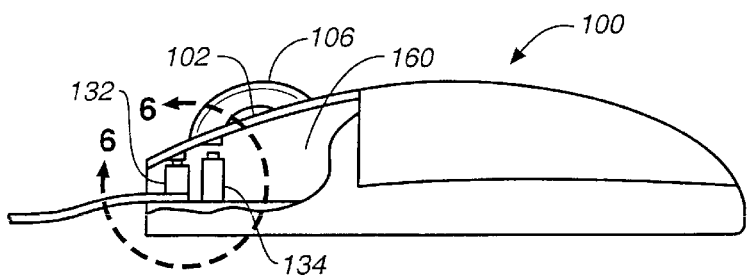
FIG._5
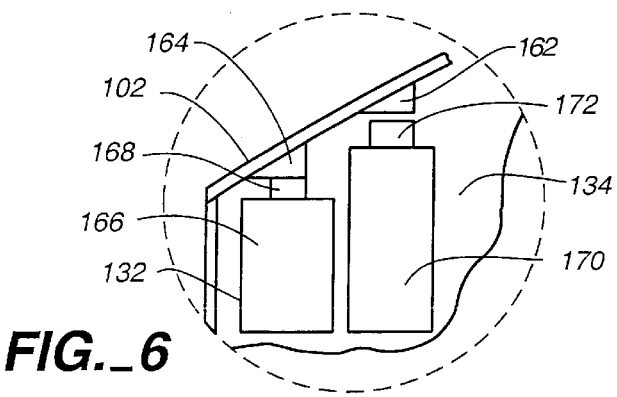
FIG._6

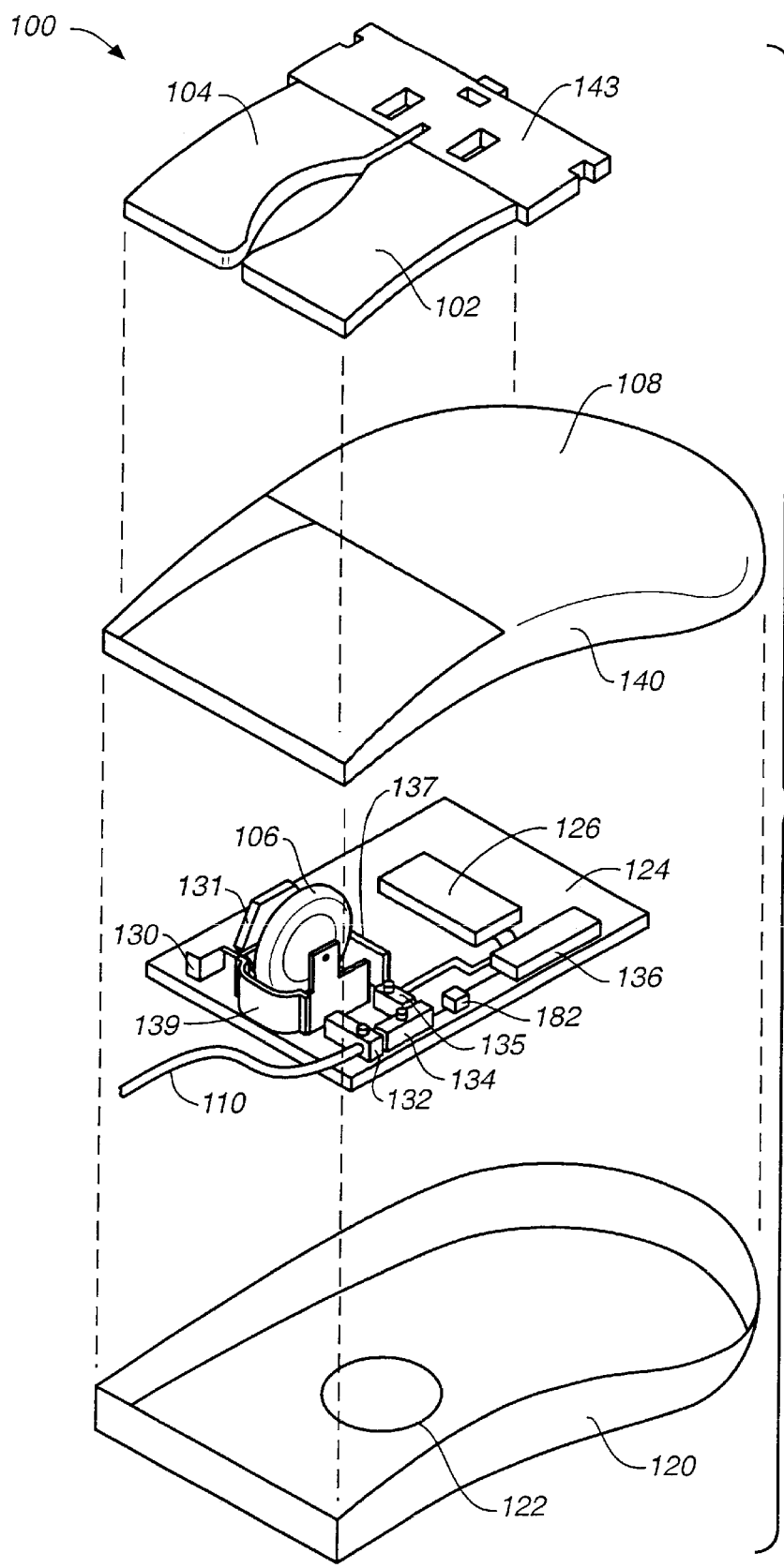
FIG._4

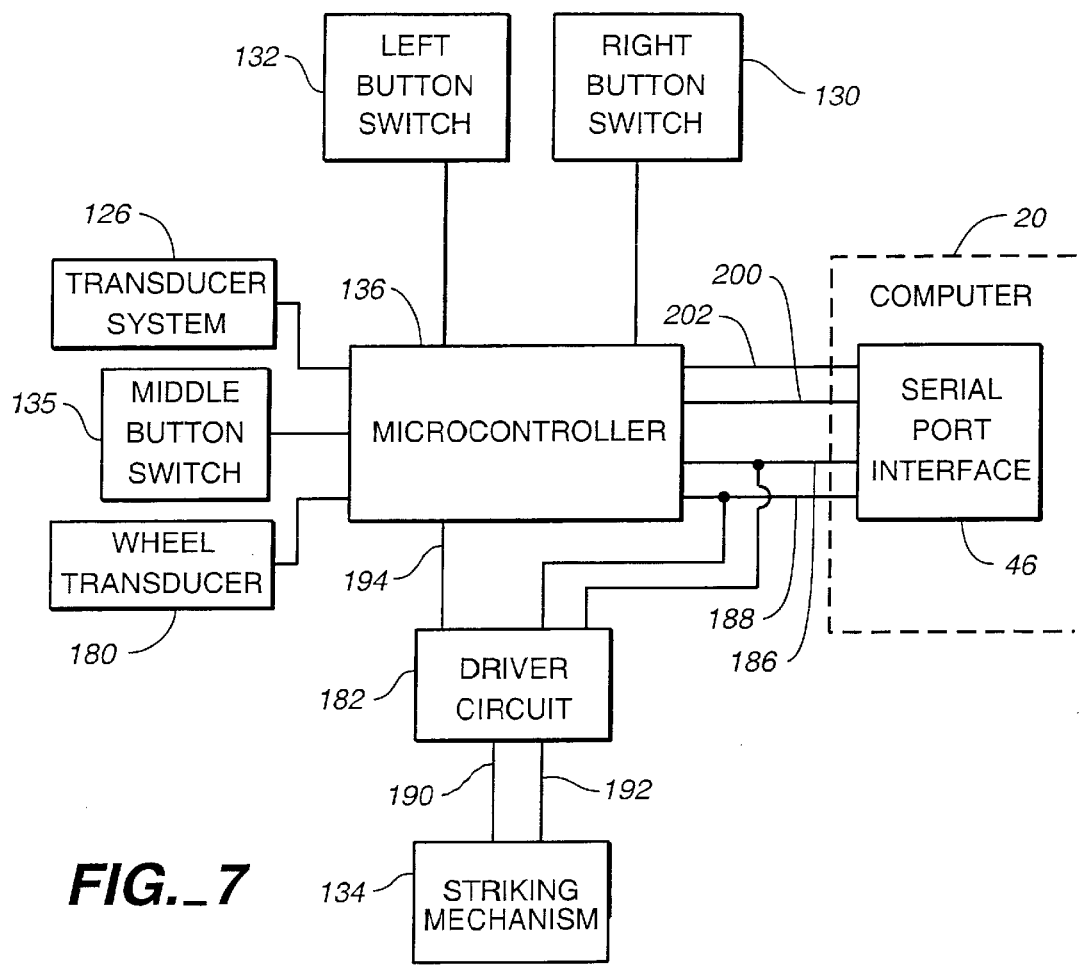
FIG._7
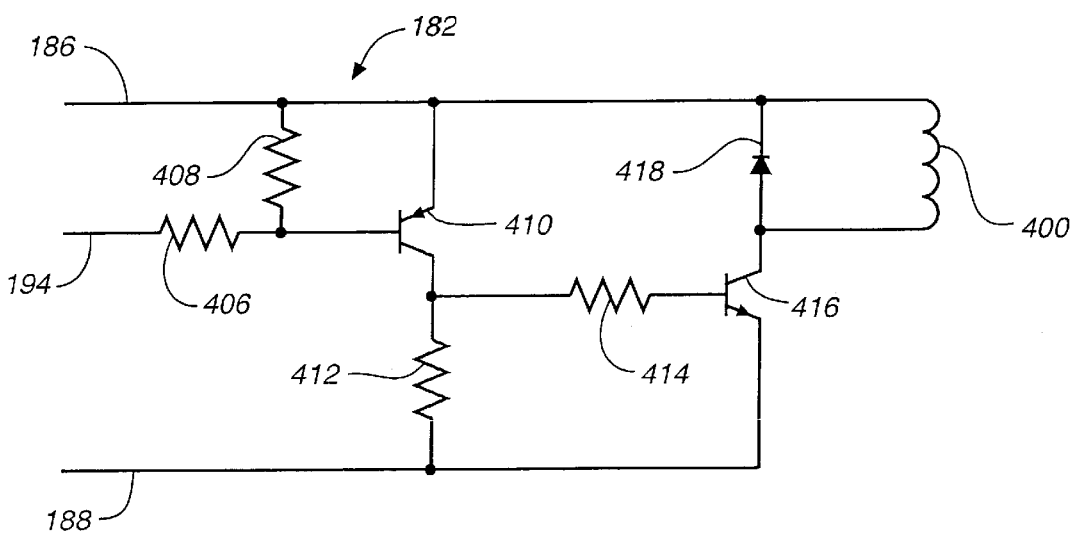
FIG._8

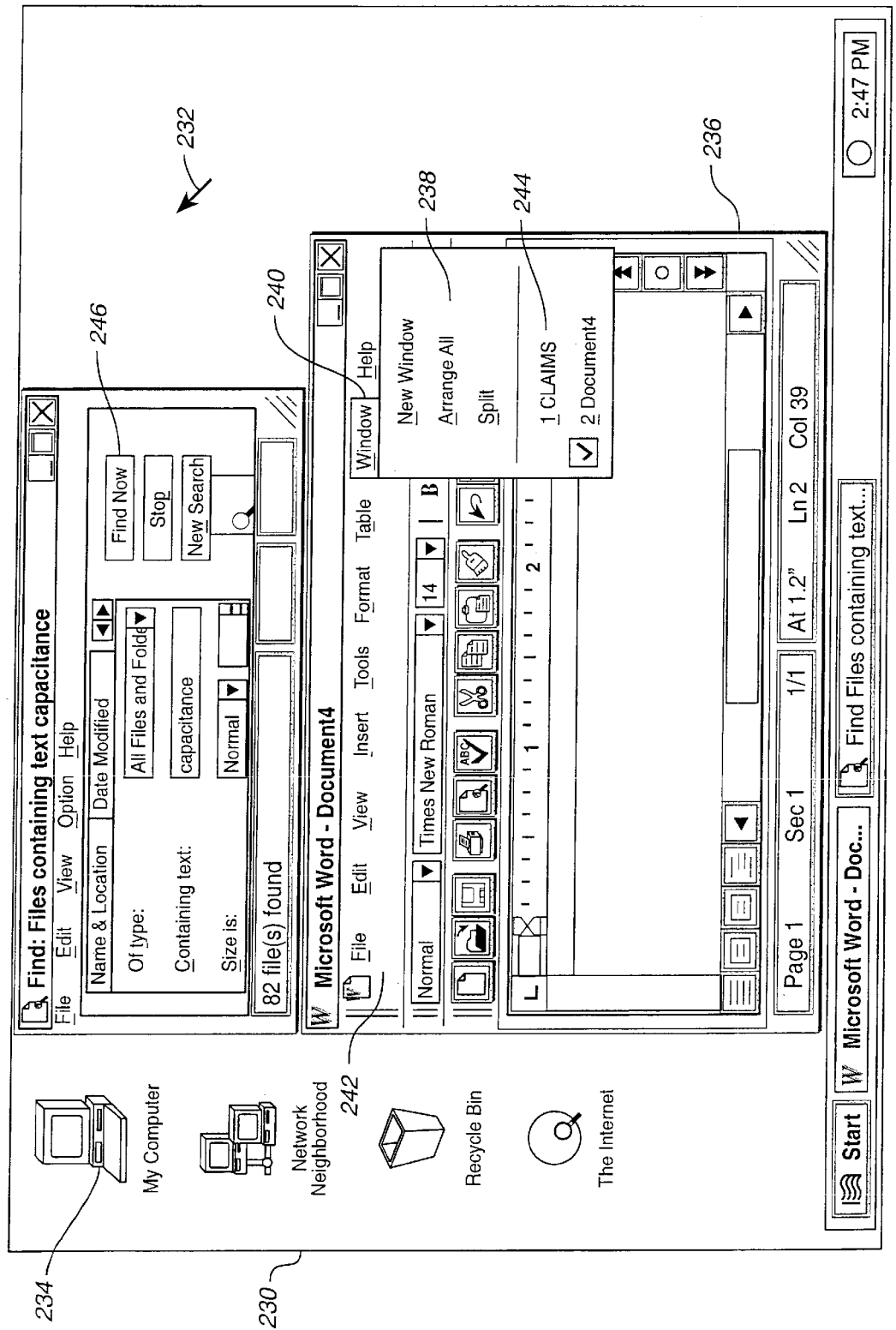
FIG._9

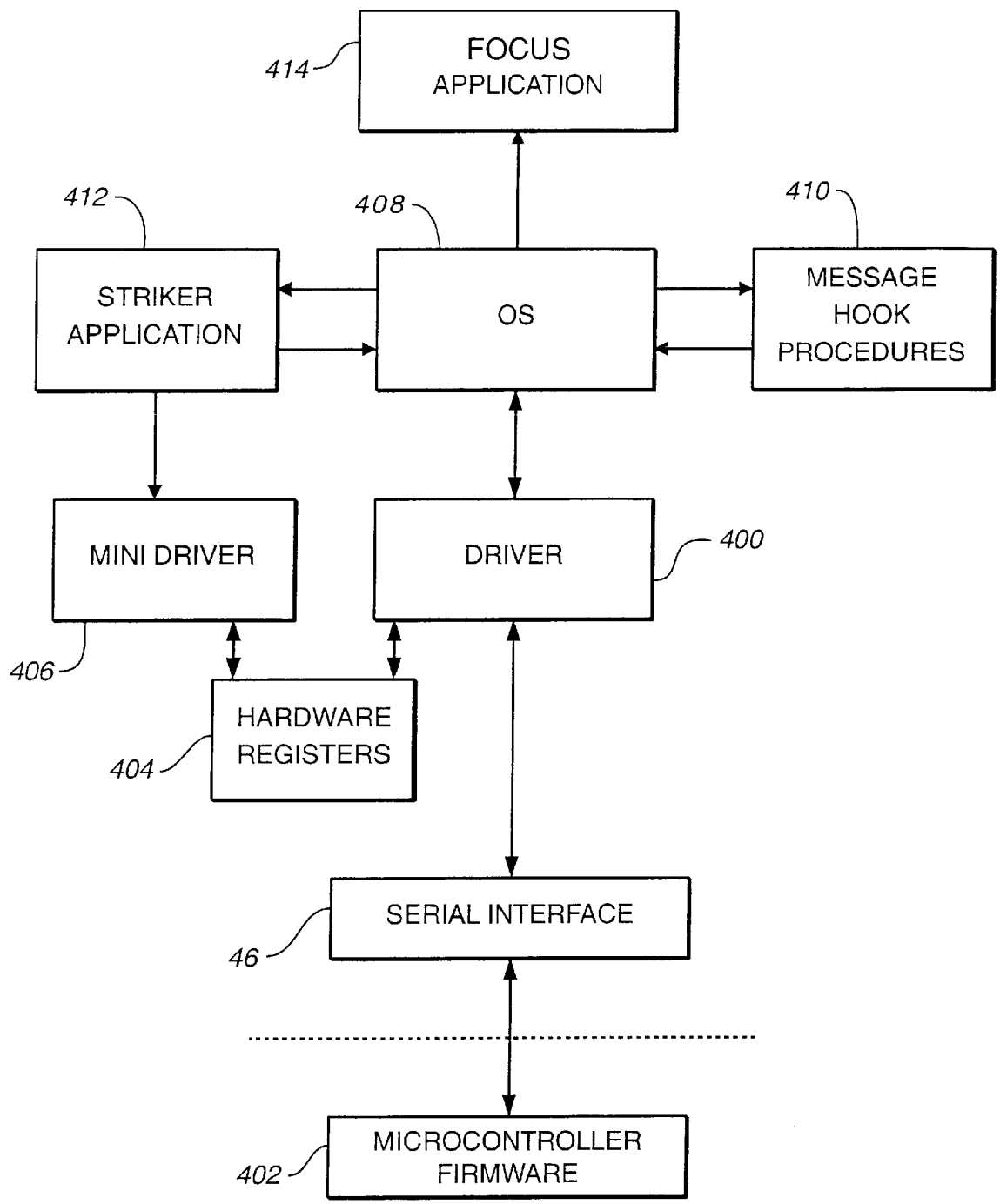
FIG._10

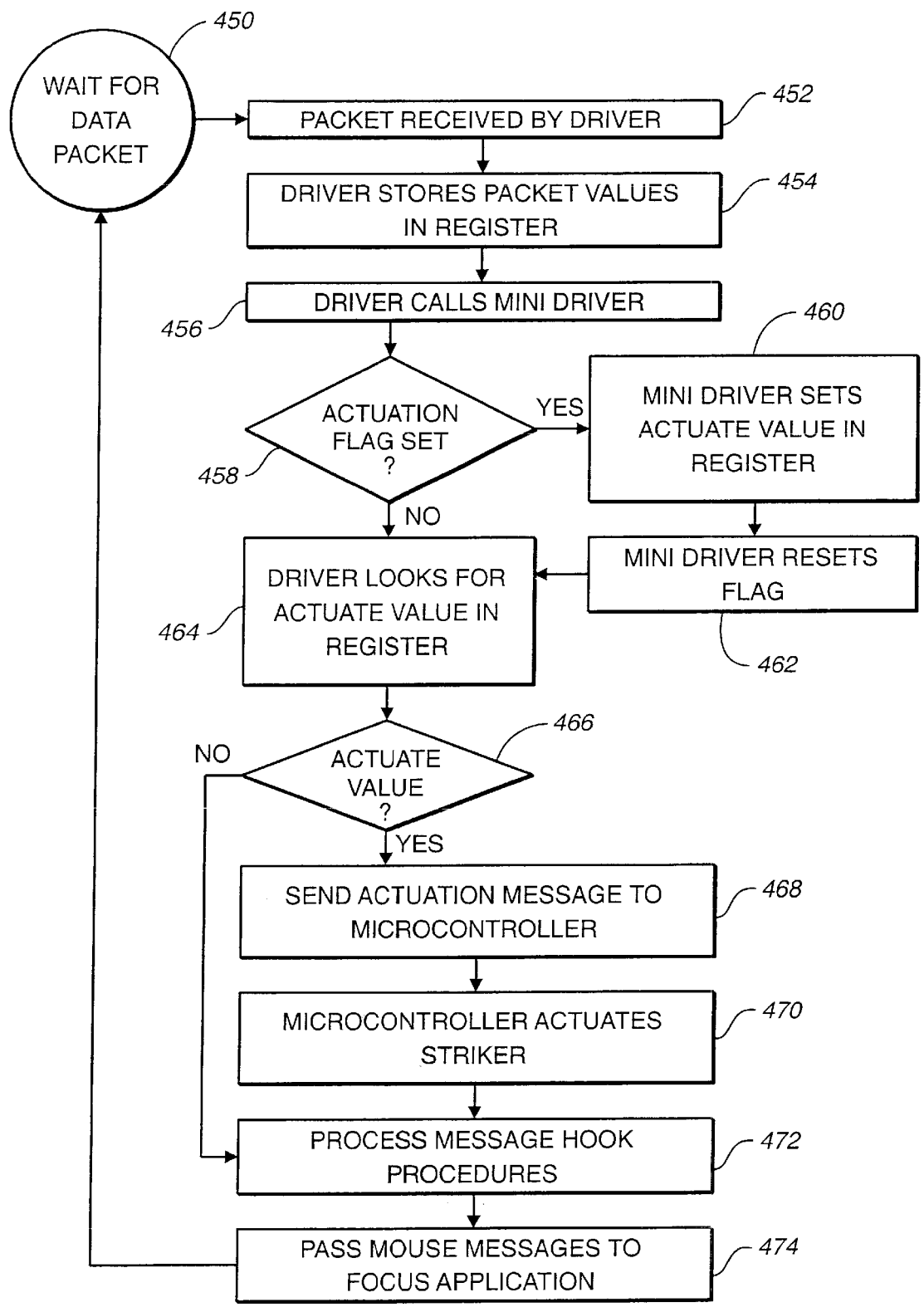
FIG._11

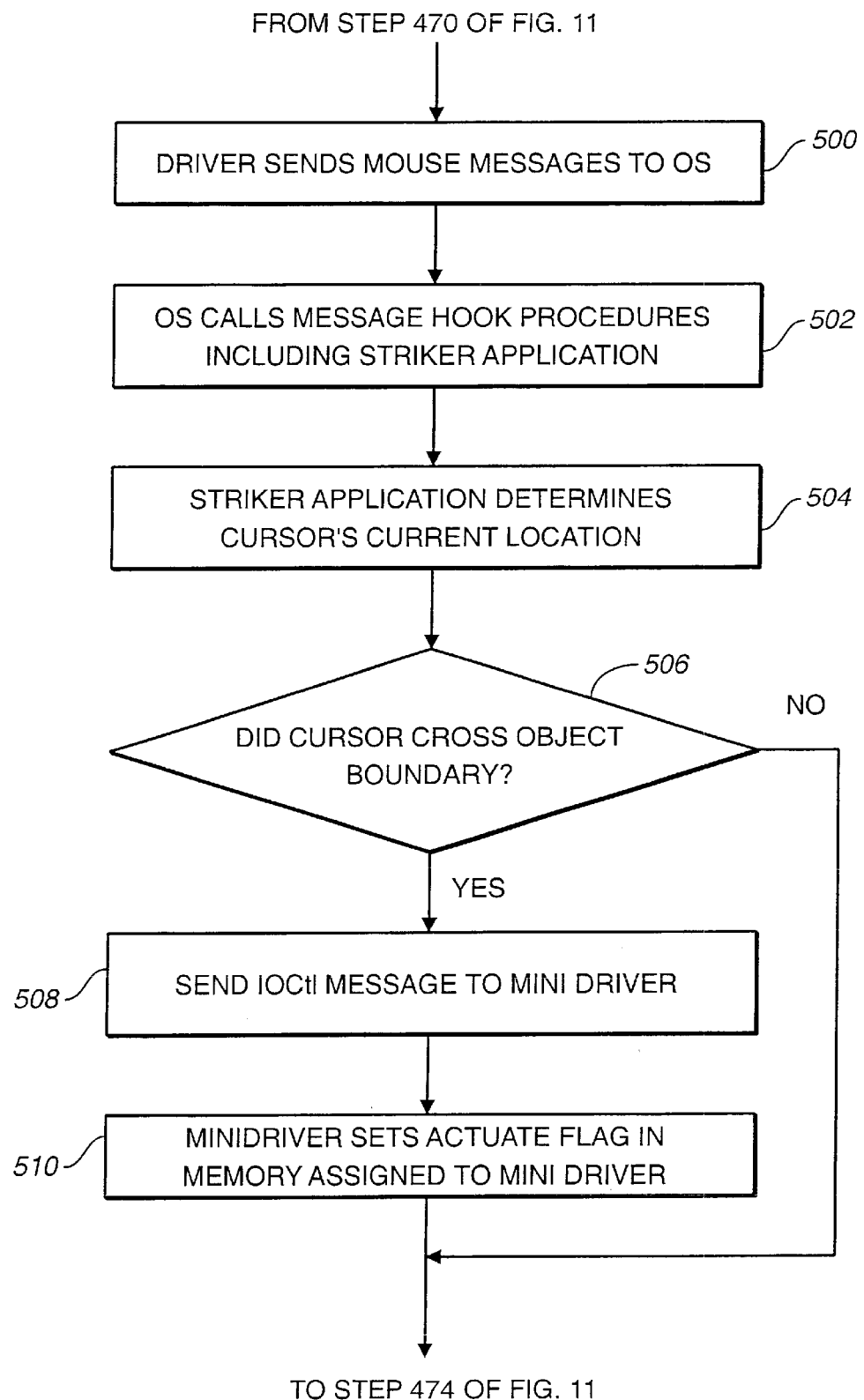
FIG._12

COMPUTER INPUT DEVICE PROVIDING TACTILE FEEDBACK

BACKGROUND OF THE INVENTION

The present invention relates to computer systems. In particular, the present invention relates to input devices for computer systems.

In most present day computer systems, an input device is provided that allows the user to control the image of a cursor on a display. By positioning the cursor over images of other objects on the display, the user is able to select items by "clicking", which involves depressing a button on the input device. The user can also drag images of objects around the display by clicking on the objects and holding down the button while moving the pointing device. This technology also allows users to select displayed command buttons that cause applications to be invoked. Users are also able to resize windows shown on the display by clicking on the edge of the window, holding the button down, and dragging the window edge until the window is the size the user wants.

For many users, it is difficult to know when the cursor is positioned over an object they wish to select. This is particularly difficult for users who are new to computers and therefore have not developed the hand-eye coordination required to manipulate the input device while watching the cursor move. In addition, some applications display objects in such a way that it is difficult for even experienced users to know if the cursor is positioned over the object that they want to select. If the cursor is not positioned properly, the user becomes quickly frustrated with their attempt to select the desired object. Therefore, additional feedback is needed to help the user make selections on a computer screen's desktop.

In the prior art, some input devices have been created that provide physical feedback to the user. These input devices have consisted of elaborate structures that move the entire input device and that require an external power source separate from the connection of the input device to the computer. The input devices are so elaborate that they are often too expensive for the common user.

SUMMARY OF THE INVENTION

An input device for a computer system includes a housing and an output circuit located in the housing. The output circuit is capable of providing an output signal to the computer system that is indicative of movement of at least a portion of the input device. A physical feedback device is also located in the housing and is capable of stimulating a localized area of the housing in response to a signal from the computer system.

In one embodiment of the invention, a mouse for a computer system includes a shell having at least one button. A solenoid is located in the shell and is capable of striking the button based upon an electrical signal from the computer system In other embodiments of the invention, computer-executable instructions on a computer readable medium of the computer system display images of a cursor and an object on the display. The instructions move the image of the cursor in response to movements of an input device connected to the computer system and activate a solenoid in the input device when the cursor crosses a boundary of an object on the display.

BRIEF DESCRIPTION OF THE DRAWINGS

FIG. 1 is a block diagram of a general operating environment for the present invention.

FIG. 2 is a perspective view of a mouse of the present invention.

FIG. 3 is a bottom view of a mouse of the present invention.

FIG. 4 is an exploded perspective view of a mouse of the present invention.

FIG. 5 is a side view with portions cut away of a mouse of the present invention.

FIG. 6 is an expanded view of the cut away portion of FIG. 5.

FIG. 7 is a block diagram of a mouse of the present invention.

FIG. 8 is a circuit diagram of the driver circuit of FIG. 7.

FIG. 9 is an image of a display screen useful in describing the functions of the present invention.

FIG. 10 is block diagram of software components of the present invention.

FIG. 11 is a flow diagram describing activation of the striking mechanism.

FIG. 12 is a flow diagram describing the invocation of a striker application.

DETAILED DESCRIPTION OF ILLUSTRATIVE EMBODIMENTS

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, program data 38, and device driver 60. The device driver process commands and information entered by a user through an input device, such as keyboard 40, microphone 43, mouse 42, or the like. Under the present invention, at least one of the input devices includes both a movement transducer and a physical feedback device. The physical feedback device is capable of stimulating a localized area of the input device. The movement transducer is capable of generating a signal that indicates when a user causes part of the input device to move. The physical feedback device and the movement transducer are connected to the processing unit 21 through a serial port interface 46 that is coupled to the system bus 23, but may be connected by other interfaces, such as a sound card, a parallel port, a game port or a universal serial bus (USB).

A monitor 47 or other type of display device is also connected to the system bus 23 via an interface, such as a video adapter 48. In addition to the monitor 47 personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

FIG. 2 is a perspective view of a mouse 100 of the present invention. Mouse 100 includes a left button 102, a right button 104, and a depressible wheel 106. Left button 102 and right button 104, along with a palm-rest 108, form an outer housing of mouse 100. A connector cable 110 passes through the housing and into the interior of mouse 100. Connector cable 110 includes a number of conductors carrying power and data signals between mouse 100 and the remainder of the computer system.

FIG. 3 is a bottom view of mouse 100 of FIG. 2. At the bottom of mouse 100 is an aperture 122 used in connection with a transducer system that tracks the X and Y movement of mouse 100 across a surface. In some embodiments, this transducer system includes a track ball that protrudes through aperture 122 and rolls across the surface. In other embodiments, the transducer system includes optical sensors that track X and Y movement of the mouse based on light that passes through aperture 122.

FIG. 4 is an exploded view of mouse 100 of FIGS. 2 and 3. In FIG. 4, it can be seen that mouse 100 includes a housing base 120 that includes aperture 122. Housing base 120 also supports a circuit board 124 that includes a transducer system 126, a right button switch 130, a left button switch 132, a middle button switch 135, a wheel transducer 131, a striking mechanism 134, and a microcontroller 136.

Transducer system 126 is the system described above that generates electrical signals based on movement of the mouse. These electrical signals are provided to microcontroller 136 through conductors connected between microcontroller 136 and transducer system 126.

Switches 130 and 132 are contacted by the bottom of buttons 104 and 102, respectively, and are closed when buttons 104 and 102 are respectively depressed. In many embodiments, switches 130 and 132 include springs that reopen the switches automatically when pressure is released from buttons 104 and 102, respectively. Electrical signals carried on conductors between microcontroller 136 and switches 130 and 132 indicate whether switches 130 and 132 are open or closed.

Middle button switch 135 is engaged by an arm extension 137 of a depressible carriage 139, which supports wheel 106. When wheel 106 is depressed, carriage 139 moves downward and closes switch 135. Springs beneath a carriage 139 cause the carriage to lift off switch 135 when force is removed from wheel 106. Through conductors connected between switch 135 and microcontroller 136, switch 135 provides an electrical signal to microcontroller 136 indicative of whether the switch is opened or closed.

An axle of wheel 106 also engages wheel transducer 131 causing a portion of wheel transducer 131 to rotate with wheel 106. Wheel transducer 131, converts this rotational movement into electrical signals that are provided to microcontroller 136.

Striking mechanism 134 is connected to microcontroller 136 through a driver circuit 182 and is activated by microcontroller 136. When activated, a portion of striking mechanism 134 strikes the bottom of button 102 such that a user feels the impact if their finger is positioned on the button. Although shown below button 102 in the embodiment of FIG. 4, in other embodiments striking mechanism 134 is positioned below button 104 and in still other embodiments is positioned below palm rest 108 of a top housing 140.

Circuit board 124 is encased between bottom housing 120 and top housing 140, which includes palm-rest 108 and wheel 106. Buttons 102 and 104 are pivotally connected to top housing 140 through a hinge portion 143 that snap-fits to the underside of top housing 140, and that flexes to allow buttons 102 and 104 to be depressed.

FIG. 5 is a side view of mouse 100 showing a cut away section 160. Within cut away section 160, striking mechanism 134 and switch 132 can be seen positioned beneath left button 106.

In FIG. 6, an expanded view of cut away section 160 can be seen showing striking mechanism 134 and switch 132 in greater detail. Button 102 is also shown in FIG. 6 and is shown to include strike plate 162 positioned over striking mechanism 134 and button extension 164 positioned over switch 132.

Switch 132 includes a base 166 and a raised portion 168, which moves downward into base 166 when button 102 is pressed toward housing 166. This movement causes switch 132 to close.

Striking mechanism 134 includes base 170 and cylinder 172. Cylinder 172 is slideably connected to base 170 and moves vertically in a direction toward strike plate 162 when striking mechanism 134 is activated. In one embodiment, striking mechanism 134 is a five-volt, one-ampere solenoid that is able to move cylinder 172 so that it strikes strike plate 162 in less than one tenth of a second. In other embodiments, striking mechanism 134 is a piezoelectric device, while in still other embodiments striking mechanism 134 includes a stepper motor with an eccentric cam positioned to periodically strike the mouse housing or buttons when the stepper motor rotates.

FIG. 7 is a block diagram showing the layout of circuit board 124 and its connection to the computer system of FIG. 1. FIG. 7 shows the connections discussed above between microcontroller 136 and the plurality of inputs to microcontroller 136 including right button switch 130, left button switch 132, middle button switch 135, wheel transducer 131 and transducer system 126.

FIG. 7 also shows a connection 194 between microcontroller 136 and driver circuit 182. Through this connection, microcontroller 136 passes a control signal to driver circuit 182 that causes driver circuit 182 to activate striking mechanism 134. Driver circuit 182 activates striking mechanism 134 through connections 190 and 192 to striking mechanism 134. The activation is powered through connections to positive and negative power supplies 186 and 188 provided by serial port interface 46.

Microcontroller 136 is also connected to serial port interface 46 by positive power supply 186 and negative power supply 188. In addition, microcontroller 136 is connected to serial port interface 46 by two control lines 200 and 202. In many embodiments, control lines 200 and 202, positive power supply 186 and negative power supply 188 are all bundled together within cable 110 of FIG. 4. Thus, the power needed by microcontroller 136 and the power needed to drive striking mechanism 134 is provided along cable 110 so that no additional exterior power source is required to operate the input device.

FIG. 8 is an expanded circuit diagram of driver circuit 182 of FIG. 7. FIG. 8 shows an embodiment of the present invention that utilizes a solenoid 400 as striking mechanism 134 of FIG. 7. In FIG. 8, solenoid 400 is activated when a current is drawn through the solenoid by an NPN transistor 416, which has its collector connected to one terminal of the solenoid. The other terminal of solenoid 400 is connected to positive power supply 186, while the emitter of transistor 416 is connected to negative power supply 186. In one embodiment, positive power supply 186 is at 5 volts and negative power supply 188 is at ground. A diode 418 is connected across the two terminals of solenoid 400 and provides a current path to discharge current produced by solenoid 400 when transistor 416 is inactive.

The base of transistor 416 is connected to one terminal of a bias resistor 414 which has its other terminal connected to the collector of a PNP transistor 410. The collector of PNP transistor 410 is also connected to one terminal of a resistor 412, which has its other terminal connected to negative power supply 188. When transistor 410 is active, a current flows through resistor 412 causing a voltage to develop at the base of transistor 416 that is sufficient to turn on transistor 416. When transistor 410 is inactive, transistor 416 is inactive.

Transistor 410 has its emitter connected to positive power supply 186 and its base connected to two resistors 408 and 406. Resistor 408 has its second terminal connected to positive power supply 186 and resistor 406 has its second terminal connected to connection 194 which is connected to a pin on microcontroller 136 of FIG. 7. When the voltage at connection 194 drops to the negative power supply, current flows through resistors 408 and 406, which act as a resistance ladder to lower the voltage at the base of transistor 410 so that it becomes active. When the voltage at connection 194 is at the positive power supply, current does not flow through the resistors and transistor 410 is inactive.

Thus, using a digital signal that is either at the positive power supply or the negative power supply, microcontroller 136 is able to activate and deactivate solenoid 400 through transistors 410 and 416.

FIG. 9 is an image of a display produced by computer 20 of FIG. 1 and displayed on monitor 47. Under embodiments of the present invention, the striking mechanism of FIGS. 2, 3, 4, 5, 6, and 7 is activated when the image of cursor 232 of display 230 crosses a boundary of an object on display 230. The image of cursor 232 is moved across display 230 by an operating system of the computer in response to mouse messages received from a mouse driver that indicate movement of the mouse. Examples of objects on the display include a desktop icon such as desktop icon 234, a window such as window 236, a pull-down menu such as pull-down menu 238, a header in a header menu such as header 240 in header menu 242, an entry in a pull-down menu such as entry 244, and a select button that can be selected by the user by pressing a mouse button while the cursor is positioned over the select button such as select button 246. In many embodiments, the striking mechanism is activated each time the edge of the cursor crosses a boundary of one of these objects. A boundary can be defined as a perimeter of the area in which the cursor must be placed to select the object.

Thus, the user feels strike mechanism 134 strike button 102 when the image of cursor 232 crosses the edge of window 236. The user feels strike mechanism 134 strike button 102 again when the cursor enters header menu 242 and when cursor 232 is positioned over header 240. As cursor 232 moves down pull-down menu 238, strike mechanism 134 strikes button 102 each time the image of cursor 232 enters or exits the boundaries of an entry in pull-down menu 238. Similarly, when the image of cursor 232 exits the boundaries of pull-down menu 238, window 236, or select button 246, strike mechanism 134 strikes button 102.

The activation of the strike mechanism based on these cursor events is controlled by a collection of software components shown in a block diagram in FIG. 10. The interaction of these components is described in flow diagrams in FIGS. 11 and 12.

In FIG. 10, mouse driver 400 waits for microcontroller firmware 402 to send a data packet describing the current conditions of mouse 100. This is shown as wait step 450 of FIG. 11. Microcontroller firmware 402 sends such data packets periodically or whenever the condition of the mouse changes. The data packet includes the current state of each of the mouse buttons, a value representing how far the mouse wheel has been rotated and the direction of that rotation, and the X-Y movement of the mouse since the last data packet.

At step 452 of FIG. 11, driver 400 receives a byte of data from microcontroller firmware 402 through serial interface 46 and at step 454 stores the value in processor memory that has been allocated by driver 400. When a complete data packet has been received, driver 400 stores the data in hardware registers 404. Driver 400 then calls a mini driver 406 of FIG. 10 at step 456 of FIG. 11.

Mini driver 406 includes a memory flag, which indicates whether the strike mechanism should be activated. This memory flag is set by an application as discussed further below in connection with step 472 of FIG. 11. When mini driver 406 is called by driver 400, mini driver 406 checks the memory flag at step 458 to determine if the strike mechanism should be activated. If the memory flag is set for activation, mini driver 406 sets an actuation value in hardware registers 404 at step 460. Mini driver 406 then resets the memory flag at step 462 so that during the next call to mini driver 406, the actuation value is not set in hardware registers 404.

After the memory flag has been reset at step 462 or if the memory flag was not set for actuation at step 458, the process continues at step 464, where control returns to driver 400. At step 464, driver 400 looks for the actuation value in registers 404 while processing the remainder of the data packet stored in registers 404. If the actuation value is set at step 466, driver 400 sends an actuation message to microcontroller firmware 402 at step 468. In a mouse system that uses a PS/2 protocol, the inventors have found that the driver message previously assigned to the "Set Scale 2:1" function may be converted into an "Actuate Striker" function without significant loss in functionality of the mouse.

Based on the "Actuate Striker" message sent by driver 400, microcontroller firmware 402 activates the striking mechanism. In an embodiment that uses a solenoid as the striking mechanism, microcontroller firmware 402 causes the input connected to driver circuit 182 to oscillate between a digital high and a digital low over a length of time. The period of the oscillations is driven by the type of solenoid and its response time. The length of the oscillations is a matter of preference and has been set between 10 and 100 milliseconds by the present inventors.

In alternative embodiments, instead of transforming an existing message of a protocol to form the "Actuate Striker" message, multiple existing messages can be combined to represent the "Actuate Striker" message. Thus, by sending a particular series of messages, driver 400 can indicate to microcontroller firmware 402 that it should activate the striking mechanism.

After microcontroller firmware 402 has activated the striking mechanism at step 470, or if the actuation value was not set at step 466, the process continues at step 472 where mouse message hook procedures are invoked. This step is discussed in more detail in FIG. 12 described below. Once the mouse message hook procedures have been processed, the mouse messages are passed to a focus application 414, which is typically associated with the top-most window on the display in operating systems such as Windows NT®, Windows 95® and Windows 98® from Microsoft Corporation. This is shown as step 474 in FIG. 11. After step 474, driver 400 returns to state 450 where it waits for the next data packet from microcontroller firmware 402.

In the discussion above, the invocation of message hook procedures was mentioned briefly in connection with step 472 of FIG. 11. FIG. 12 provides a more detailed flow diagram of this process as well as a description of how the striker application sets the actuation memory flag in mini driver 406.

The process of FIG. 12 begins with step 500 where driver 400 sends mouse messages to the computer's operating system (OS) 408. In some embodiments, operating system 408 is a Windows NT®, a Windows 95®, or Windows 98® brand operating system provided by Microsoft Corporation of Redmond, Washington. The mouse messages created by driver 400 are based on values in the data packets received from the mouse. In most operating systems, there are separate messages that indicate if a particular mouse button is up or down and separate messages describing rotation of the wheel. In all of these messages, driver 400 includes the current X-Y coordinates of the display's cursor.

In some embodiments, operating system 408 includes a mouse message hook list that identifies a series of mouse message hook procedures 410. When operating system 408 receives a mouse message, it examines its mouse message hook last to determine if any mouse message hook procedures have registered themselves with operating system 408. If at least one mouse message hook procedure has registered itself with operating system 408, operating system 408 passes the mouse message to the registered mouse message hook procedure 410 that appears first on the list.

Under embodiments of the present invention, a striker application 412 registers itself as a mouse message hook procedure to be included in the message hook list. Thus, when OS 408 receives a mouse message, it passes the mouse message to striker application 412, as shown in step 502 of FIG. 12.

Striker application 412 uses the coordinates of the cursor found in the mouse message to determine what the cursor is positioned over in step 504. In operating systems such as Windows NT®, Windows 95®, and Windows 98®, this is accomplished using a series of system calls. First, a handle to the current window is retrieved from the system using a WindowFromPoint() call that includes the current coordinates of the cursor.

The returned window handle is then passed to a number of functions that provide information about the cursor's position within the window or information about the window itself. For example, a call to IsIconic() returns an indication of whether or not the window is minimized and a call to GetClassName() returns an indication of whether the window is a select button. A call to DefWindowProc() returns an indication of which portion of the window the cursor is over. Values returned by DefwindowProc() can indicate that the cursor is over a menu, a maximize or minimize button, a close button, a border, a scroll bar, a title bar, or a client area.

Striker application 412 also includes a memory value that indicates where the cursor was before the current mouse message. At step 506 of FIG. 12, striker application 412 compares this memory value to the information returned by the various calls to determine if the cursor has crossed a boundary since the last mouse message. For example, striker application 412 determines if the cursor has transitioned onto or off of a minimized window, or onto or off of a select button. Striker application 412 also determines if the cursor has crossed the border of a window, entered the menu bar of a window, or crossed over a particular menu header of a menu bar.

If the cursor has crossed a boundary at step 506, striker application 412 creates and sends a message to mini driver 406 to set the actuation flag in mini driver 406. This is shown as step 508 in FIG. 12. In one embodiment, the message sent by striker application 412 is an Input/Output Control Message (IOCtl), which is selected from a set of standard IOCtl messages that are associated with current mini drivers. In particular, the selected IOCtl message is one that would otherwise not perform an operation in mini driver 406. For example, the IOCtl message "SetDeviceType" can be used.

When mini driver 406 receives the message from striker application 412, it sets the actuation flag in its associated memory location at step 510. When the next data packet is received by driver 400, this flag will cause mini driver 406 to set the actuation value in the hardware register so that driver 400 issues the actuation command to the mouse. The process then continues at step 474 of FIG. 11.

By providing physical feedback to the user when cursor 232 crosses boundaries of objects on the display, the present invention improves user efficiency by increasing the feedback provided to the user and allowing the user to make quicker selections. In addition, since an embodiment of the present invention uses a small solenoid to provide physical feedback, it is inexpensive and can be powered through the input device's connection to the computer.

Although the present invention has been described with reference to specific embodiments, workers skilled in the art will recognize that changes may be made in form and detail without departing from the spirit and scope of the invention.

What is claimed is:

1. An input device for a computer system, the input device comprising:
   a housing;
   an output circuit located in the housing providing an output signal to the computer system that is indicative of movement of at least a portion of the input device; and
   a physical feedback device including a striking mechanism located in the housing striking a localized area of the housing in response to a signal from the computer system.

2. The input device of claim 1 wherein the input device is a mouse.

3. The input device of claim 2 wherein the localized area of the housing is a button.

4. The input device of claim 1 wherein the physical feedback device comprises a solenoid.

5. The input device of claim 4 wherein the input device is a mouse.

6. A mouse for a computer system, the mouse comprising:
   a shell comprising at least one button; and
   a striking mechanism located in the shell, and capable of striking the button based upon a signal from the computer system.

7. The mouse of claim 6 further comprising a switch located proximate the button and capable of being closed by depressing the button.

8. The mouse of claim 7 further comprising a transducer capable of generating an electrical signal that is indicative of movements of the mouse.

9. The mouse of claim 6 wherein the mouse is capable of being completely powered by a connection to the computer system.

10. A computer-readable medium having computer-executable instructions for performing steps in a computer comprising:
    (a) displaying images of a cursor and an object on a display, the object having boundaries;
    (b) moving the image of the cursor across an object boundary in response to movements of a mouse connected to the computer; and
    (c) activating a striking mechanism in the mouse when the cursor crosses the object boundary to cause the striking mechanism to strike a shell of the mouse.

11. The computer-readable medium of claim 10 wherein activating the striking mechanism comprises:
    determining a current location of the cursor over the display;
    comparing the current location to a stored past location; and
    determining that the cursor has crossed a boundary based on the comparison.

12. The computer-readable medium of claim 11 wherein activating the striking mechanism further comprises sending a message from a driver to a mouse microcontroller to cause the mouse microcontroller to activate the striking mechanism.

13. The computer-readable medium of claim 10 wherein the object is a window.

14. The computer-readable medium of claim 10 wherein the object is a select button that is capable of being selected by the user by positioning the cursor within the boundaries of the select button and activating a button on the mouse.

15. The computer-readable medium of claim 14 wherein the select button is located within the boundaries of a second object and activating the striking mechanism comprises activating the striking mechanism when the cursor crosses a boundary of the second object and activating the striking mechanism when the cursor crosses a boundary of the select button.

16. The computer-readable medium of claim 10 wherein the object is an icon.

17. The computer-readable medium of claim 16 wherein the icon is a tool icon in a tool bar.

18. The computer-readable medium of claim 16 wherein the icon is a selection icon in a pull-down menu.

19. The computer-readable medium of claim 10 wherein activating the striking mechanism causes a portion of the striking mechanism to strike a button on the mouse.

20. A method for providing force feedback to a computer user, the method comprising:
    tracking movements of an input device;
    producing an image of a cursor on a display along with an image of an object;
    moving the image of the cursor across the display in response to movements of the input device; and
    activating a striking mechanism in the input device when the image of the cursor overlaps a portion of the image of the object by generating a message in a driver based on an actuation value stored in a hardware register assigned to receive data packets from the input device.

21. The method of claim 20 wherein the actuation value is stored in the hardware register when the image of the cursor overlaps a portion of the image of the object.

22. The method of claim 21 wherein activating a striking mechanism further comprises:
    passing the message from the driver to a microcontroller in the input device;

converting the message in the microcontroller into a binary control signal;

activating a drive circuit connected to the microcontroller based on the binary control signal; and energizing the striking mechanism based on the activation of the drive circuit.

\* \* \* \* \*

UNITED STATES PATENT AND TRADEMARK OFFICE
CERTIFICATE OF CORRECTION

PATENT NO. : 6,452,586 B1
DATED : September 17, 2002
INVENTOR(S) : Holmdahl et al.

It is certified that error appears in the above-identified patent and that said Letters Patent is hereby corrected as shown below:

Column 8,
Line 28, replace "last" with -- list --.

Column 9,
Line 44, after "housing" insert -- striking a localized area of the housing --.

Signed and Sealed this

Seventeenth Day of June, 2003

JAMES E. ROGAN
*Director of the United States Patent and Trademark Office*